H. H. HOLDEN.
GEARING.
APPLICATION FILED FEB. 23, 1910.
1,008,150.
Patented Nov. 7, 1911.
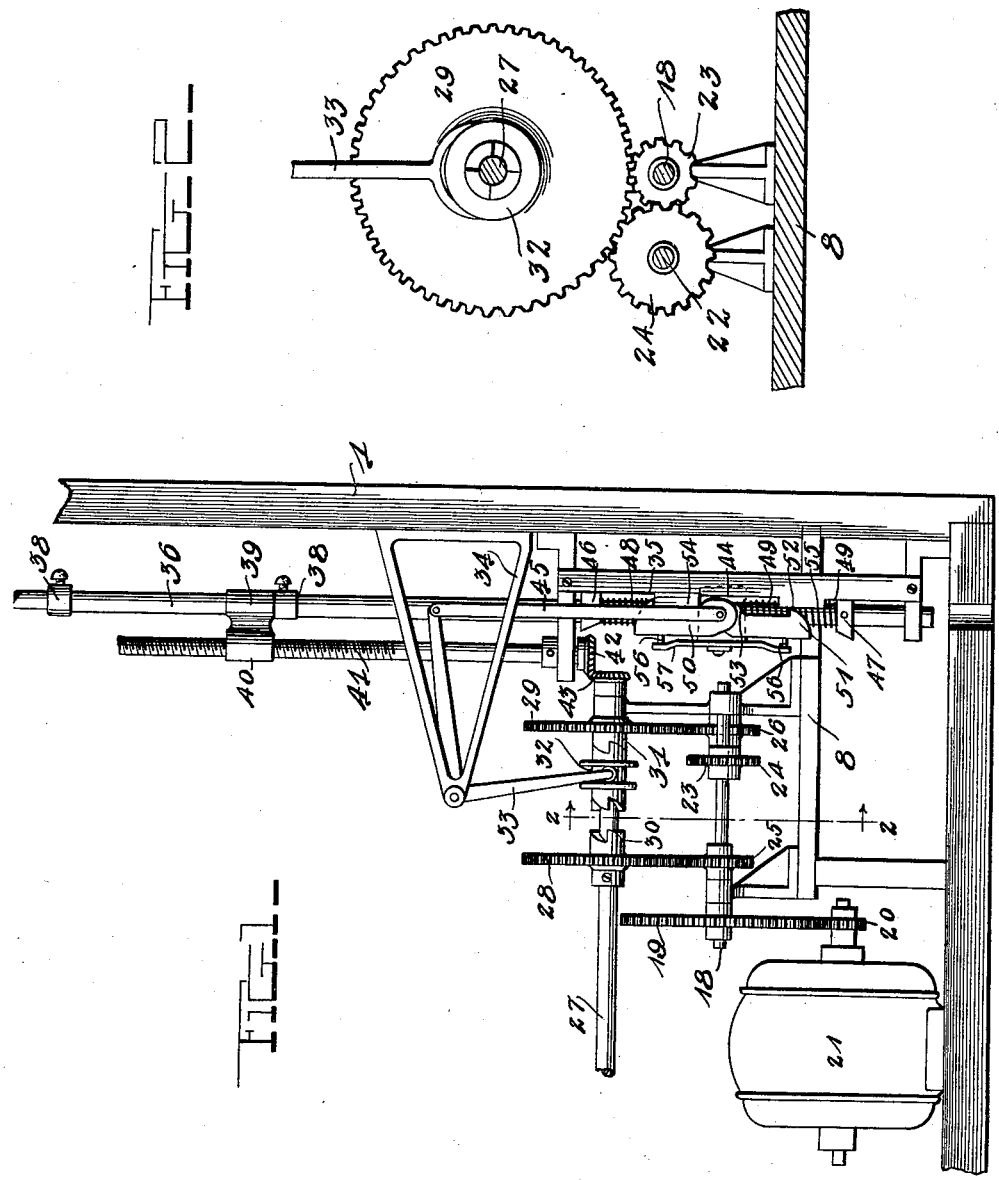
Witnesses
J. R. Pine
O. B. Hopkins
Inventor
H. H. Holden
by H. B. Willson & Co.
Attorneys

UNITED STATES PATENT OFFICE.

HARRY H. HOLDEN, OF LOS ANGELES, CALIFORNIA.

GEARING.

1,008,150.            Specification of Letters Patent.        Patented Nov. 7, 1911.

Application filed February 23, 1910. Serial No. 545,367.

*To all whom it may concern:*

Be it known that I, HARRY H. HOLDEN, a citizen of the United States, residing at Los Angeles, in the county of Los Angeles and State of California, have invented certain new and useful Improvements in Gearing; and I do declare the following to be a full, clear, and exact description of the invention, such as will enable others skilled in the art to which it appertains to make and use the same.

This invention relates to improvements in automatic sign displaying devices.

The invention consists in the construction and arrangement of parts as will be hereinafter described and particularly pointed out in the claims.

In the accompanying drawings, Figure 1 is an enlarged view showing the reversing mechanism; Fig. 2 is a vertical sectional view of the same taken on the line 2—2 of Fig. 1.

On one end of the shaft 18 is fixedly mounted a spur gear 19 which is engaged with and driven by a pinion 20 on the shaft of an electric motor 21 or other suitable driving mechanism which is preferably arranged in the frame of the device as shown.

Revolubly mounted in the bearing brackets of the shaft 18 and spaced a suitable distance therefrom is a counter shaft 22 which is geared to and driven by the shaft 18 through pinions 23 and 24 arranged on said shafts 18 and 22, as shown. The shafts 18 and 22 when thus geared together turn in opposite directions. On the shaft 18 is fixedly mounted a power transmitting pinion 25, while on the shaft 22 is mounted a power transmitting pinion 26.

Mounted in suitable bearings and arranged above the shafts 18 and 22 is a power transmitting shaft 27. On the shaft 27 are loosely mounted two power transmitting gears 28 and 29, which are respectively engaged by the pinions 25 and 26 on the shafts 18 and 22 of the driving mechanism, whereby said gears 28 and 29 are continuously driven in opposite directions. On the inner sides of each of the gears 28 and 29 are formed the clutch members 30 and 31 of a reversing clutch 32 which is keyed to slide on the shaft 27 and to revolve the same in one direction or the other when thrown into engagement with one or the other of the clutch members 30 or 31 of the power transmitting gears 28 and 29. The clutch 32 has operatively engaged therewith one arm of a bell crank shifting lever 33 which is pivotally mounted in a suitable bearing bracket 34 secured to the frame 1 and has its opposite end connected by a link to an automatic clutch operating device hereinafter described, by means of which the clutch may be operated to turn the shaft 27 in a reverse direction.

The operating mechanism for the reversing clutch comprises a supporting frame 35 which is secured to the main frame 1 adjacent to its lower end as shown. In the frame 35 is slidably mounted the lower end of a trip rod 36. On the trip rod 36 are arranged stop collars 38 which are adjustably secured to the rod by set screws or other fastening devices. Slidably engaged with the rod 36 between the stop collars 38 is a rod operating sleeve 39 on which is formed a nut 40 having a threaded engagement with a threaded shifting rod 41, which is revolubly mounted in suitable bearings in the frame 1 and which is provided on its lower end with a beveled pinion 42. The beveled pinion 42 is operatively engaged with a similar pinion 43 on the adjacent end of the power transmitting shaft 27, whereby when said shaft is turned in one direction or the other by the driving mechanism hereinbefore described, said rod will also be turned in one direction or the other, thereby screwing the nut 40 upwardly or downwardly, thus moving the sleeve up or down on the trip rod 36 and into engagement with one or the other of the stops 38, whereby when the sleeve has reached said stops, the rod 36 will be actuated to operate the clutch shifting mechanism.

On the lower portion of the rod 36 within the supporting frame 35 is slidably mounted a clutch shifting block 44, which is connected by a link 45 with the adjacent arm of the bell crank clutch shifting lever 33. On the shaft 36 above the block 44 is rigidly secured a beveled pawl releasing block 46, while on the rod below the block 44 is arranged a beveled pawl releasing block 47. On the rod between the block 46 and the adjacent side of the clutch shifting block 44 is arranged a coiled clutch shifting spring 48, while between the opposite side of the block 44 and the block 47 is arranged a clutch shifting spring 49. Pivotally mounted or secured to the clutch shifting block 44 are upper and lower clutch holding pawls 50 and 51 each of which is provided with stop engaging shoulders 52 and 53 which are adapted to be engaged with the opposite shoulders of stop lugs 54 and 55 formed on the supporting frame 35. The pawls 50 and 51 are provided with spring engaging lugs 56 which are adapted to be engaged by the opposite ends of a spring 57 secured to the clutch shifting block 44, whereby the pawls are sprung into engagement with the lugs 54 and 55 when brought opposite thereto, thus locking the clutch mechanism in its adjusted position.

In the drawings the clutch 32 is shown to be in engagement with the gear 29 whereby the shaft 27 will be driven in the direction of movement of said gear until the clutch is shifted into engagement with the gear 28 which will occur when the sleeve 39, which is shown as just having come into engagement with the stop 38, pushes the trip rod 36 and the pawl releasing block 46 downwardly, thus compressing the spring 48 and at the same time relaxing the spring 49. The downward movement of the rod 36 and block 46 is continued until the beveled edge of the block is brought into engagement with the free end of the pawl 50, whereupon said pawl will be disengaged by the beveled edge of the block 46 from the stop lug 54, thus permitting the pressure of the spring 48 to force the shifting block 44 downwardly, thus pulling on the link 45 and rocking the bell crank shifting lever 33 which will shift the clutch 32 into engagement with the gear 28, thereby reversing the movement of the shaft 27, until the nut 40 and sleeve 39 are moved upwardly by the threaded rod 41 into engagement with the stop collar 38 on the trip rod, which will pull the trip rod upwardly, thereby compressing the spring 49 until the pawl releasing block 47 is brought into engagement with the free end of the pawl 51 which has been previously engaged with the stop lug 55 on the downward movement of the shifting block 44 by the expansion of the spring 48, as hereinbefore described. When the block 47 has thus been brought into engagement with the pawl 51 and released the same from the stop 55, the spring 49 will force the shifting block 44 upwardly thereby operating the clutch shifting lever 33 in the opposite direction to again engage the clutch 32 with the gear 29 which will again reverse the movement of the shaft 27. The shoulders 53 on the pawls 50 and 51 are provided to engage the inner shoulders of the stop lugs 54 and 55, thereby limiting the movement of the shifting block 44 by the clutch shifting springs 48 and 49.

Having thus described my invention, what I claim is:—

1. The combination of a driving shaft a driven shaft, gearing connecting said shafts, comprising a clutch member, a slidable trip rod, means for reciprocating said rod, a lever having one end engaging said clutch member, a clutch block connected to the opposite end of said lever, means on the trip rod to periodically move said block in opposite directions, oppositely projecting pawls carried by said block, and fixed stops at the opposite limit of movement of said block to be engaged by said pawls.

2. The combination of a driving shaft, a driven shaft, gearing connecting said shafts comprising a clutch member, a slidable trip rod, means for reciprocating said rod, a lever having one end engaging said clutch member, a clutch block connected to the opposite end of said lever, oppositely projecting pawls carried by said block, fixed stops at the opposite limits of movement of said pawls to be engaged thereby, springs secured to said block and bearing upon said pawls, and trip lugs carried by the trip rod and arranged to actuate said pawls in opposition to said springs.

3. The combination of a drive shaft a plurality of pinions thereon, a power transmitting shaft, a plurality of pinions loosely mounted thereon, one of said pinions being in engagement with a pinion on the drive shaft, a counter shaft rotatably mounted adjacent the drive shaft a pair of wheels thereon, one of said wheels engaging a pinion upon the drive shaft and the other of said wheels engaging a pinion upon the power transmitting shaft, the pinions upon the power transmitting shaft having opposing clutched faces, a sleeve slidably mounted upon the power transmitting shaft and adapted to move into or out of engagement with said clutched faces, a bell crank lever having one arm connected with said sleeve, a link pivotally connected at one end to the other arm of said lever, a slidable trip rod, a clutch block carried by said rod and secured to the opposite end of said link, a pair of stop collars adjustably secured upon the trip rod, a rod operating sleeve slidable on said trip rod between the stop collars, and means operating from the power transmitting shaft for moving said sleeve upon said trip rod.

In testimony whereof I have hereunto set my hand in presence of two subscribing witnesses.

HARRY H. HOLDEN.

Witnesses:
J. H. FABER,
H. S. ROLLINS.